US011938959B2

(12) United States Patent
Sameer

(10) Patent No.: US 11,938,959 B2
(45) Date of Patent: Mar. 26, 2024

(54) DRIVING ASSISTANCE DEVICE, SYSTEM THEREOF, AND METHOD THEREOF

(71) Applicant: HERE Global B.V., Eindhoven (NL)

(72) Inventor: Priyank Sameer, Mumbai (IN)

(73) Assignee: HERE GLOBAL B.V., Eindhoven (NL)

( * ) Notice: Subject to any disclaimer, the term of this patent is extended or adjusted under 35 U.S.C. 154(b) by 228 days.

(21) Appl. No.: 17/499,376

(22) Filed: Oct. 12, 2021

(65) Prior Publication Data

US 2023/0114577 A1    Apr. 13, 2023

(51) Int. Cl.
| | |
|---|---|
| *B60W 50/14* | (2020.01) |
| *B60W 30/095* | (2012.01) |
| *B60W 40/04* | (2006.01) |
| *G06N 20/00* | (2019.01) |

(52) U.S. Cl.
CPC ........ *B60W 50/14* (2013.01); *B60W 30/0956* (2013.01); *B60W 40/04* (2013.01); *G06N 20/00* (2019.01); *B60W 2050/146* (2013.01); *B60W 2554/4023* (2020.02)

(58) Field of Classification Search
CPC .. B60W 50/14; B60W 30/0956; B60W 40/04; B60W 2050/146; B60W 2554/4023; G06N 20/00
See application file for complete search history.

(56) References Cited

U.S. PATENT DOCUMENTS

| | | | |
|---|---|---|---|
| 10,821,886 B1 | 11/2020 | Breedvelt-schouten et al. | |
| 2009/0192666 A1* | 7/2009 | Trippler | G08G 1/163 |
| | | | 701/31.4 |
| 2015/0260531 A1 | 9/2015 | Ehsani et al. | |
| 2018/0173237 A1* | 6/2018 | Reiley | G05D 1/0061 |
| 2018/0182245 A1* | 6/2018 | Takabayashi | H04W 4/44 |
| 2018/0276986 A1 | 9/2018 | Delp | |
| 2020/0361452 A1* | 11/2020 | McGill | B60W 50/045 |
| 2021/0269041 A1* | 9/2021 | Ito | B60W 50/0097 |

FOREIGN PATENT DOCUMENTS

| | | |
|---|---|---|
| DE | 102016206694 A1 | 10/2017 |
| WO | 2018220439 A2 | 12/2018 |

* cited by examiner

*Primary Examiner* — Mohamed Barakat
(74) *Attorney, Agent, or Firm* — Peter H. Yu; HERE GLOBAL B.V

(57) ABSTRACT

A driving assistance apparatus includes a memory and a processor in communication with the memory and configured to execute instructions stored in the memory operable to determine at least one surrounding vehicle based on location information of the at least one surrounding vehicle, wherein the at least one surrounding vehicle is configured to receive at least one vehicle signal from a host vehicle. The processor is further configured to determine a line of sight (LOS) of the at least one surrounding vehicle based on the at least one vehicle signal, wherein the line of sight is defined by a perceivability of a driver of the at least one surrounding vehicle to view the at least one vehicle signal. The processor is further configured to determine a confidence level of the at least one surrounding vehicle based on the determined LOS.

16 Claims, 11 Drawing Sheets

DRIVING ASSISTANCE DEVICE, SYSTEM THEREOF, AND METHOD THEREOF

FIELD

The present disclosure relates to a driving assistance device, a system thereof, and a method thereof. In particular, the present disclosure relates to a driving assistance device by detecting a confidence level of a surrounding vehicle, a system thereof, and a method thereof.

BACKGROUND

To ensure the traffic safety, various signals may be generated to alert vehicles travelling on the roads about upcoming or ongoing driver's operations and traffic events. Such signals may be transmitted by either a host vehicle (hereinafter "vehicle signal") or a traffic facility ("non-vehicle signal"). The vehicle signals may be generated by different vehicle lights of the host vehicle. For example, in response to an operation, such as a lane change or a braking, of a driver of a vehicle, the vehicle may turn on a corresponding light until the operation is completed. The non-vehicle signals may be generated by different traffic lights or traffic management persons. For example, the non-vehicle signals may include traffic control signals, fixed time signals, manually operated signals, traffic actuated (automatic) signals, pedestrian signals, and special traffic signals. The corresponding traffic lights are turned on until the corresponding traffic event ends. The traffic management persons, e.g., policemen, may generate the signals by using their hands.

In response to the generated vehicle or non-vehicle signals, a driver of a vehicle surrounding the host vehicle or the traffic events (hereinafter "surrounding vehicle") may operate the surrounding vehicle to avoid colliding with the host vehicle, other vehicles, or pedestrians or avoid violating traffic rules.

However, the driver of the surrounding vehicle often fails to observe the above signals properly. For example, the driver of the surrounding vehicle may have no line of sight when his or her sight is obstructed by a third vehicle traveling between the host vehicle and the surrounding vehicle. For another example, the driver of the surrounding vehicle may be distracted by looking at his or her cell phone or looking in a different direction. In such cases, the surrounding vehicle may collide with the host vehicle, other vehicles, or pedestrians or may violate the traffic rules. For example, when the driver of the surrounding vehicle fails to perceive the vehicle signals, the surrounding vehicle may collide with the host vehicle turns into a lane where the surrounding vehicle is traveling. For another example, when the driver of the surrounding vehicle fails to perceive the non-vehicle signals and thus runs a red light, the surrounding vehicle may collide, at the intersection, with the host vehicle passing through a green light.

Therefore, there is a need to provide a device, a system, and a method to assist a host vehicle in avoiding potential car accidents by detecting a line of sight and an attentiveness of a driver of a surrounding vehicle.

SUMMARY

In one aspect, the present disclosure provides a driving assistance apparatus, comprising a memory and a processor in communication with the memory and configured to execute instructions stored in the memory operable to determine at least one surrounding vehicle based on location information of the at least one surrounding vehicle, wherein the at least one surrounding vehicle is configured to receive at least one vehicle signal from a host vehicle. The processor is further configured to determine a line of sight (LOS) of the at least one surrounding vehicle based on the at least one vehicle signal, wherein the line of sight is defined by a perceivability of a driver of the at least one surrounding vehicle to view the at least one vehicle signal. The processor is further configured to determine a confidence level of the at least one surrounding vehicle based on the determined LOS.

In another aspect, the present disclosure provides a driving assistance device, comprising a controller configured to determine at least one surrounding vehicle based on location information of the at least one surrounding vehicle, wherein the at least one surrounding vehicle is configured to receive at least one vehicle signal from a host vehicle. The controller is further configured to determine a line of sight (LOS) of the at least one surrounding vehicle based on the at least one vehicle signal, wherein the line of sight is defined by a perceivability of a driver of the at least one surrounding vehicle to view the at least one vehicle signal. The controller is further configured to determine an attentiveness of the driver of the at least one surrounding vehicle based on driver data, wherein the attentiveness is defined by a level of the driver of the at least one surrounding vehicle to actually perceive the at least one vehicle signal. The controller is further configured to determine a confidence level of the at least one surrounding vehicle based on the determined LOS and the determined attentiveness.

In another aspect, the present disclosure provides a driving assistance method, comprising obtaining a request for driving assistance from a host vehicle configured to transmit at least one vehicle signal. The driving assistance method also comprises determining at least one surrounding vehicle based on location information of the at least one surrounding vehicle, wherein the at least one surrounding vehicle is configured to receive the at least one vehicle signal from the host vehicle. The driving assistance method also comprises determining a line of sight (LOS) of the at least one surrounding vehicle based on the at least one vehicle signal, wherein the line of sight is defined by a perceivability of a driver of the at least one surrounding vehicle to view the at least one vehicle signal. The driving assistance method also comprises determining a confidence level of the at least one surrounding vehicle based on the determined LOS. The driving assistance method also comprises determining at least one route for the host vehicle based on the determined confidence level of the at least one surrounding vehicle.

BRIEF DESCRIPTION OF THE DRAWINGS

The above and other objects, features, and advantages of the present disclosure should be more apparent from the following detailed description taken in conjunction with the accompanying drawings.

DETAILED DESCRIPTION

Figure 1:
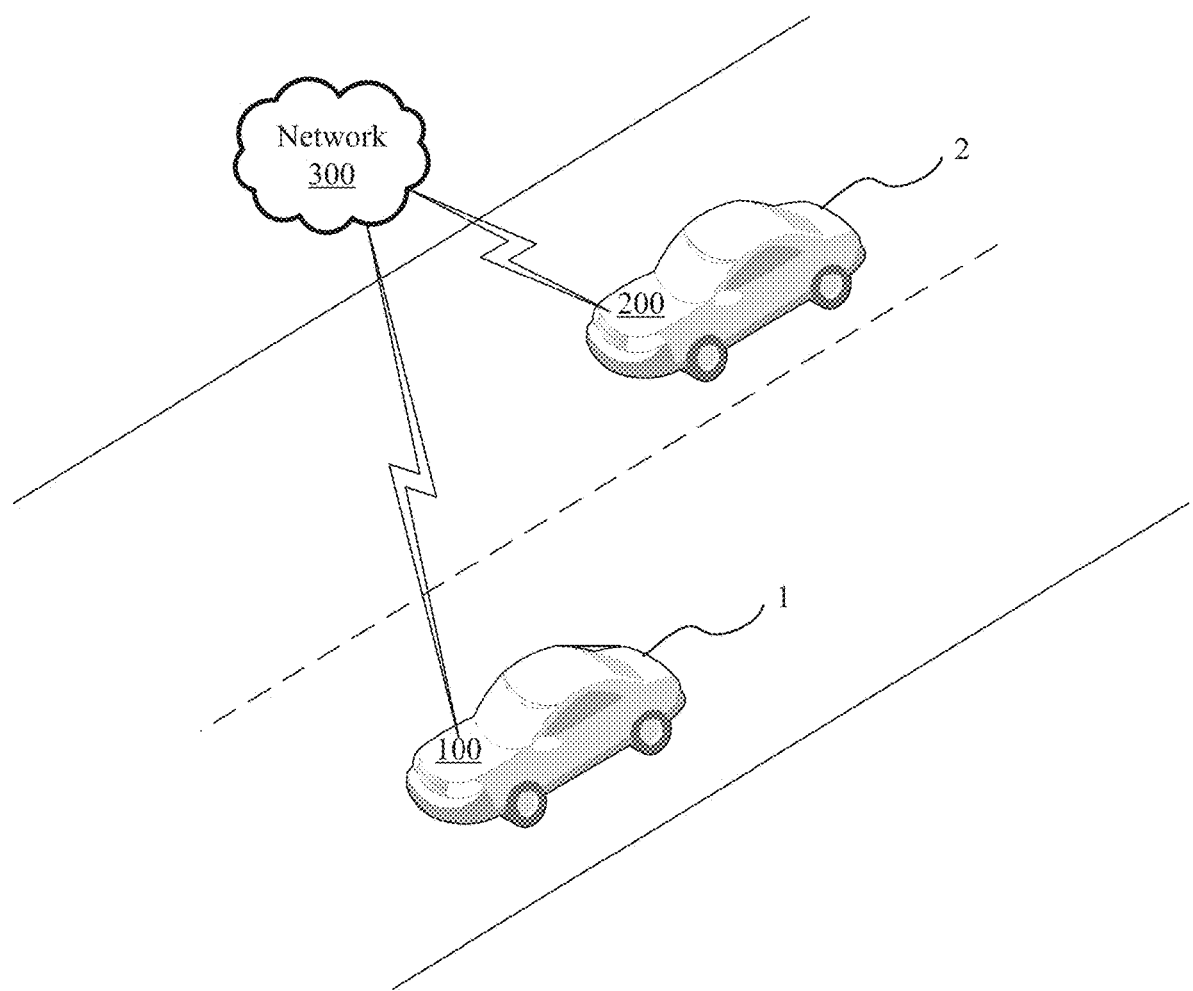
FIG. 1 is a drawing illustrating a host vehicle travelling on a left lane and a surrounding vehicle traveling on a right lane according to a first embodiment of the present disclosure.

Hereinafter, specific embodiments of the present disclosure are described in detail with reference to the drawings. In adding the reference numerals to the elements of each drawing, it should be noted that the identical or equivalent element is designated by the identical numeral even when they are displayed on other drawings. Further, in describing the embodiments of the present disclosure, a detailed description of well-known features or functions has been omitted in order not to unnecessarily obscure the gist of the present disclosure.

Unless otherwise defined, all terms used herein, including technical and scientific terms, have the same meaning as those generally understood by those having ordinary skill in the art to which the present disclosure pertains. Such terms as those defined in a generally used dictionary should be interpreted as having meanings equal to the contextual meanings in the relevant field of art and should not be interpreted as having ideal or excessively formal meanings unless clearly defined as having such in the present application.

In the present disclosure, the term "vehicle" refers to but is not limited to an automobile, a motorcycle, a bicycle, a scooter, and a skateboard.

In the present disclosure, the term "host vehicle" refers to a vehicle configured to determine whether another vehicle perceives a vehicle signal generated or transmitted by the host vehicle or a non-vehicle signal.

In the present disclosure, the term "surrounding vehicle" or "surrounding vehicle of interest" refers to a vehicle, which is configured to perceive a vehicle signal generated or transmitted by the host vehicle or a non-vehicle signal and may affect the driving of the host vehicle. A line of sight (LOS) and an attentiveness of the surrounding vehicle may be determined. The surrounding vehicle is also spaced apart from the host vehicle within a predetermined distance. In an embodiment, the surrounding vehicle may include a vehicle directly next to the host vehicle without any intervening vehicles between the surrounding vehicle and the host vehicle. Such a surrounding vehicle is referred to as a "neighboring vehicle." In another embodiment, the surrounding vehicle may also include a vehicle spaced apart from the host vehicle by at least one intervening vehicle therebetween.

It should be understood by one of ordinary skill in the art that a vehicle may function as the host vehicle only, the surrounding vehicle only, or both the host vehicle and the surrounding vehicle.

In the present disclosure, the term "vehicle signal" refers to a signal generated or transmitted by the host vehicle, e.g., in the form of a vehicle light.

In the present disclosure, the term "non-vehicle signal" refers to a signal generated or transmitted by a traffic facility, e.g., a traffic light, or a traffic management person, e.g., a policeman. The non-vehicle signals may include traffic control signals, fixed time signals, manually operated signals, traffic actuated (automatic) signals, pedestrian signals, and special traffic signals.

In the present disclosure, the term "signal source" refers to an object or a person generating or transmitting the vehicle signals or the non-vehicle signals.

In the present disclosure, the term "traffic data" refers to data containing traffic conditions. The traffic data may reflect the traffic conditions at a predetermined distance from the host vehicle or reflect the overall traffic conditions in an entire area, e.g., a city, where the host vehicle is located. The traffic data may include, for example, the information regarding traffic accidents, traffic jams, constructions. The traffic data may be obtained in real time or at a predetermined time interval or prestored in a database. The database may be stored at a server of the driving assistance system or maintained/updated by a third party. The traffic data may be obtained by a server, the host vehicle, or the surrounding vehicle.

In the present disclosure, the term "signal data" refers to data contained in the vehicle signals and the non-vehicle signals. The signal data may be obtained in real time or at a predetermined time interval. The signal data may be obtained by the server, the host vehicle, or the surrounding vehicle.

In the present disclosure, the term "vehicle data" refers to data containing traveling conditions of the surrounding vehicle. The vehicle data may include the LOS. The LOS reflects the extent to which a driver of a surrounding vehicle may perceive a vehicle signal or a non-vehicle signal (perceivability), regardless of an attentiveness of the driver. The vehicle data may also include location information of the surrounding vehicle. The vehicle data may be obtained in real time or at a predetermined time interval. The vehicle data may be obtained by the server, the host vehicle, or the surrounding vehicle.

In the present disclosure, the term "driver data" refers to data reflecting an attentiveness of a driver of a surrounding vehicle to actually perceive a vehicle signal or a non-vehicle signal. The driver data may include eye/face data and response data. The driver data may be obtained in real time or at a predetermined time interval. The driver data may be obtained by the server, the host vehicle, or the surrounding vehicle.

First Embodiment of Driving Assistance System

Figure 2:
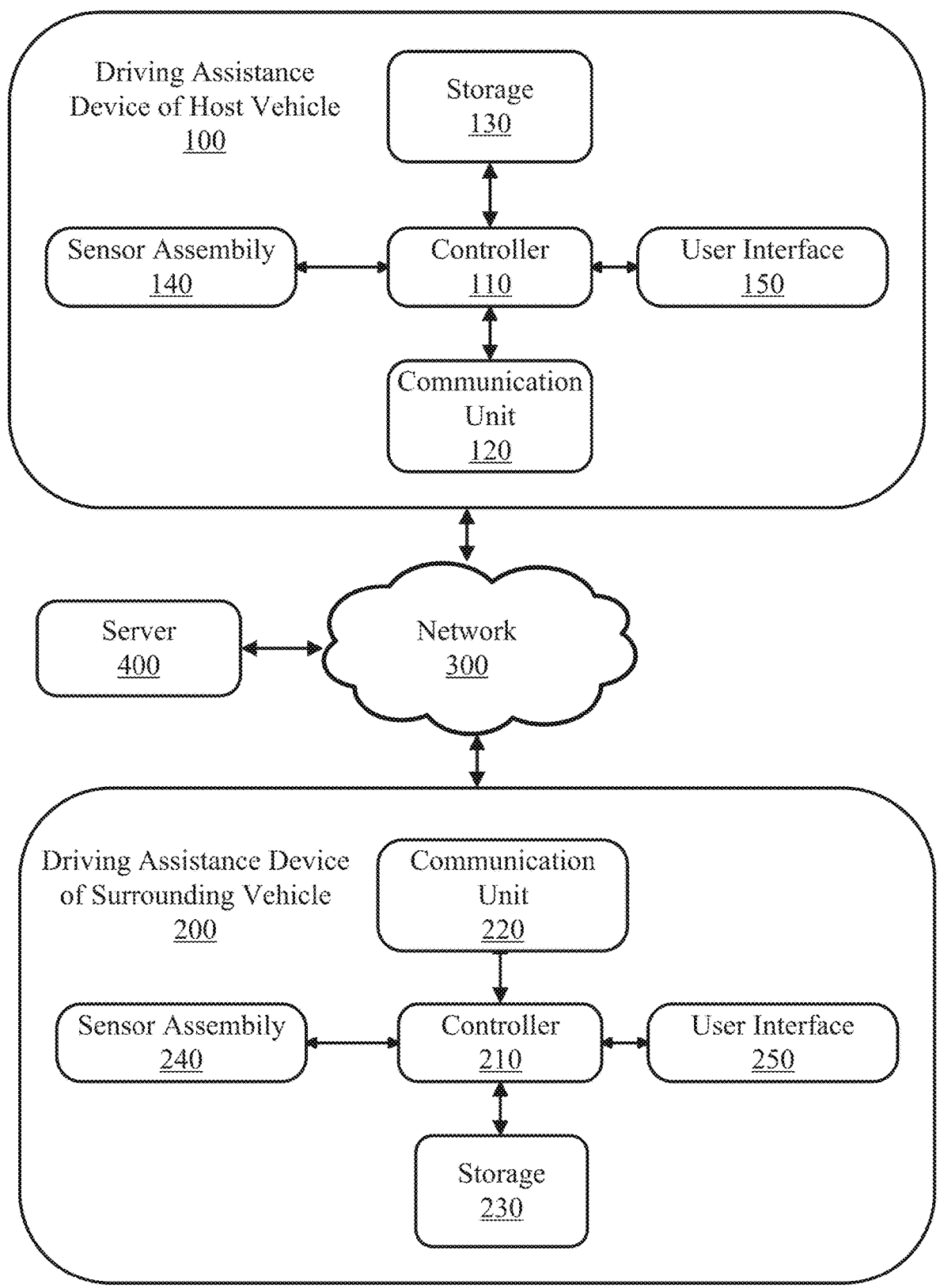
FIG. 2 is a block diagram illustrating a driving assistance system comprising a driving assistance device of the host vehicle, a driving assistance device of the surrounding vehicle, and a server according to the first embodiment of the present disclosure.
Figure 3:
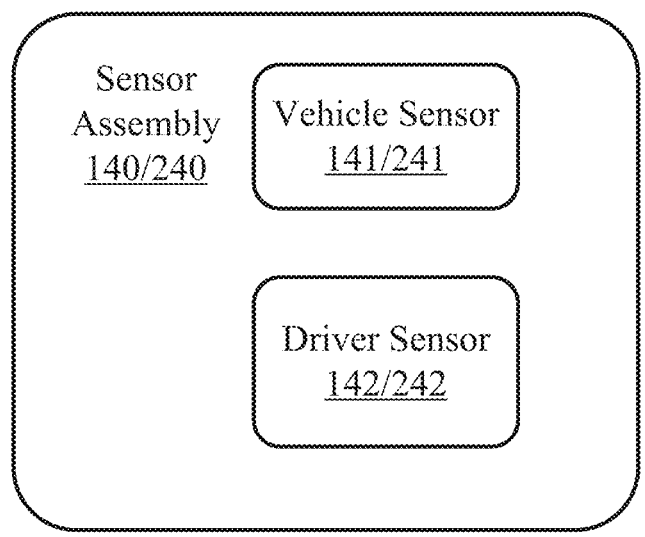
FIG. 3 is a block diagram illustrating a sensor assembly of the driving assistance device of the host vehicle and a sensor assembly of the driving assistance device of the surrounding vehicle according to the first embodiment of the present disclosure.
Figure 4:
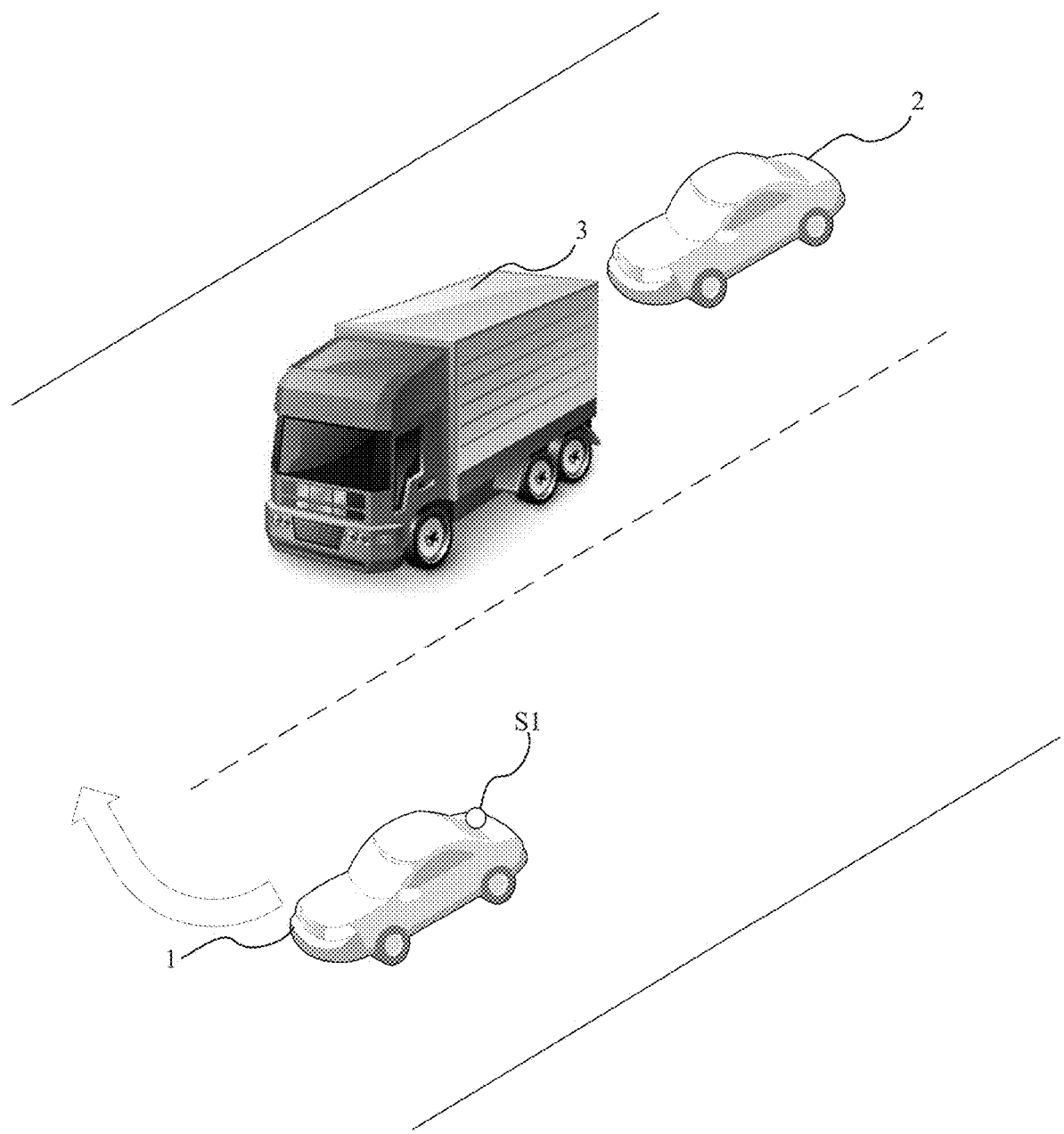
FIG. 4 is a drawing illustrating that a line of sight (LOS) of the surrounding vehicle is obstructed by a truck traveling on the right lane.

FIG. 1 is a diagram illustrating a host vehicle 1 travelling on a left lane and a surrounding vehicle 2 traveling on a right lane according to a first embodiment of the present disclosure. FIG. 2 is a block diagram illustrating a driving assistance system comprising a driving assistance device 100 of the host vehicle 1, a driving assistance device 200 of the surrounding vehicle 2, and a server 400 according to the first embodiment of the present disclosure. FIG. 3 is a block diagram illustrating a sensor assembly 140 of the driving assistance device 100 of the host vehicle 1 and a sensor assembly 240 of the driving assistance device 200 of the surrounding vehicle 2 according to the first embodiment of the present disclosure. FIG. 4 is a block diagram illustrating that a line of sight (LOS) of the surrounding vehicle 2 is obstructed by a truck 3.

Referring to FIGS. 1, 2, 3, and 4, the driving assistance system according to the first embodiment of the present disclosure comprises a host vehicle 1, a surrounding vehicle 2, and a server 400 each communicably connected to a network 300. The host vehicle 1 may comprise a driving assistance device 100 and the surrounding vehicle 2 may comprise a driving assistance device 200. The host vehicle 1 and the surrounding vehicle 2 may communicate with each other via the driving assistance device 100 and the driving assistance device 200.

Driving Assistance Device 100 of Host Vehicle 1

Further referring to FIGS. 2, 3, and 4, in an embodiment, the driving assistance device 100 of the host vehicle 1 comprises a controller 110, a communication unit 120 communicably connected to the controller 110, a storage 130 communicably connected to the controller 110, a sensor assembly 140 communicably connected to the controller 110, and a user interface 150 communicably connected to the controller 110. In an embodiment, the driving assistance device 100 may be integrated into a host vehicle 1 and thus become a part of the host vehicle 1. In another embodiment, a plurality of the above elements of the driving assistance device 100 may be separate from the host vehicle 1 while the remaining elements of the driving assistance device 100 may be integrated into the host vehicle 1 and thus become a part of the host vehicle 1. In another embodiment, the driving assistance device 100 may be an independent device configured to be communicably connected to the host vehicle 1.

In an embodiment, the controller 110 of the driving assistance device 100 of the host vehicle 1 is configured to obtain the traffic data, the signal data, the vehicle data, and the driver data. The controller 110 is further configured to determine the surrounding vehicles for the host vehicle 1. The controller 110 is further configured to determine surrounding vehicles of interest from the determined surrounding vehicles. The controller 110 is further configured to calculate the confidence levels for the surrounding vehicles of interest. The controller 110 is further configured to generate at least one route for the host vehicle 1 based on the calculated confidence levels so that the host vehicle 1 may avoid potential accidents. In another embodiment, the functions of the controller 110 discussed above may be performed by a controller 410 of the server 400. Thus, some these functions are provided in more details in the section of the server 400.

The controller 110 in the present disclosure can be implemented by any appliances or by any software or applications run by the appliances. The controller 110 may be connected to a workstation or another external device (e.g., control panel, remote) and/or a database for receiving user inputs, system characteristics, and any of the values described herein. The controller 110 may include a processor. Optionally, the controller 110 may include an input device and/or a sensing circuit in communication with any of the sensors. The sensing circuit receives sensor measurements from as described above. Optionally, the controller 110 may include a drive unit for receiving and reading non-transitory computer media having instructions. Additional, different, or fewer components may be included. The processor is configured to perform instructions stored in memory for executing the algorithms described herein.

The processor may be a general purpose or specific purpose processor, an application specific integrated circuit (ASIC), one or more programmable logic controllers (PLCs), one or more field programmable gate arrays (FPGAs), a group of processing components, or other suitable processing components. Processor is configured to execute computer code or instructions stored in memory or received from other computer readable media (e.g., embedded flash memory, local hard disk storage, local ROM, network storage, a remote server, etc.). The processor may be a single device or combinations of devices, such as associated with a network, distributed processing, or cloud computing.

In an embodiment, the communication unit 120 of the driving assistance device 100 of the host vehicle 1 is configured to communicate, via the network 300, with the server 400 and/or the surrounding vehicle 2. Thus, the communicate unit 120 may obtain data from and transmit data to the server 400 and/or the surrounding vehicle 2. When both the host vehicle 1 and the surrounding vehicle 2 are connected to the network 300 via their corresponding communication units 120 and 220, the host vehicle 1 and the surrounding vehicle 2 may communicate with each other to transmit data described in the present disclosure.

The communication unit 120 may include any operable connection, ingress ports, and egress ports. An operable connection may be one in which signals, physical communications, and/or logical communications may be sent and/or received. An operable connection may include a physical interface, an electrical interface, and/or a data interface. The communication unit 120 may be connected to the network 300. The network 300 may include wired networks (e.g., Ethernet), wireless networks, or combinations thereof. The wireless network may be a cellular telephone network, an 802.11, 802.16, 802.20, or WiMax network, a Bluetooth pairing of devices, or a Bluetooth mesh network. Further, the network 300 may be a public network, such as the Internet, a private network, such as an intranet, or combinations thereof, and may utilize a variety of networking protocols now available or later developed including, but not limited to TCP/IP based networking protocols.

In an embodiment, the storage 130 of the driving assistance device 100 of the host vehicle 1 is configured to store data received from the surrounding vehicle 2 and/or the server 400. The storage 130 may include one or more devices (e.g., memory units, memory devices, storage devices, etc.) for storing data and/or computer code for completing and/or facilitating the various processes described in the present disclosure.

The storage 130 may include random access memory (RAM), read-only memory (ROM), hard drive storage, temporary storage, non-volatile memory, flash memory, optical memory, or any other suitable memory for storing software objects and/or computer instructions. The storage 130 may include database components, object code components, script components, or any other type of information structure for supporting the various activities and information structures described in the present disclosure. The storage 130 may be communicably connected to processor via a processing circuit and may include computer code for executing (e.g., by processor) one or more processes described herein. For example, the storage 130 may include graphics, web pages, HTML files, XML files, script code, shower configuration files, or other resources for use in generating graphical user interfaces for display and/or for use in interpreting user interface inputs to make command, control, or communication decisions.

In an embodiment, the sensor assembly 140 of the driving assistance device 100 of the host vehicle 1 is configured to obtain the traffic data and the signal data within the predetermined distance from the host vehicle 1. In another embodiment, the controller 110 may automatically request to retrieve the traffic data and the signal data from a database 431 of the server 400 via the communication unit 120. In another embodiment, instead of the database 431, a separate database, maintained or updated by a third party, may be used to store the traffic data and the signal data. The separate database may be maintained or updated at a predetermined time interval. In response to a request from the controller 110, the database 431 may transmit, to the controller 110, the traffic data and the signal data of an area corresponding to the predetermined distance from host vehicle 1. The functions of the sensor assembly 140 of the driving assistance device 100 of the host vehicle 1 discussed herein may be also performed by a sensor assembly 240 of the driving assistance device 200 of the host vehicle 2 or by the server 400.

In an embodiment, the sensor assembly 140 of the driving assistance device 100 of the host vehicle 1 is further configured to obtain the vehicle data. To this end, the sensor assembly 140 may comprise a vehicle sensor 141 configured to obtain the vehicle data of the surrounding vehicle 2.

Specifically, the vehicle sensor 141 is configured to obtain the LOS and the location information of the surrounding vehicle 2 based on the traffic data, the signal data, and/or the vehicle data. As shown in FIG. 1, when the surrounding vehicle 2 is present within the predetermined distance from the host vehicle 1 (determined based on the location information of the surrounding vehicle 2), the host vehicle 1 may use the vehicle sensor 141 to determine whether the LOS of the driver of the surrounding vehicle is obstructed by an object.

Figure 5:
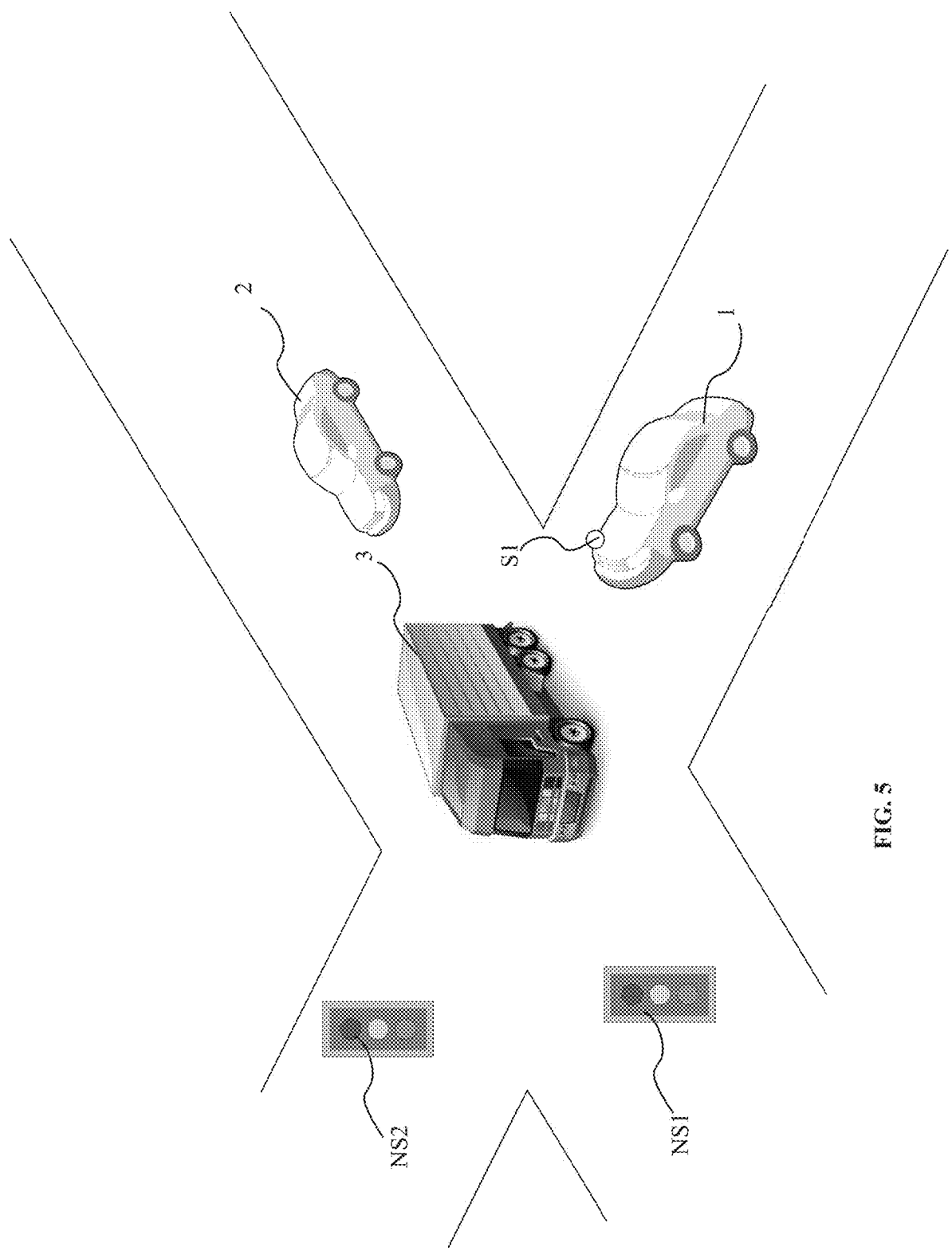
FIG. 5 is a drawing illustrating that the LOS of the surrounding vehicle to perceive a non-vehicle signal is obstructed by a truck at an intersection.

FIG. 4 is a drawing illustrating that a line of sight (LOS) of the surrounding vehicle 2 to perceive a vehicle signal is obstructed by a truck 3 traveling on the right lane. FIG. 5 is a drawing illustrating that the LOS of the surrounding vehicle 2 to perceive a non-vehicle signal is obstructed by a truck 3 at an intersection.

Further referring to FIG. 4, when the host vehicle 1 turns into the right lane, the host vehicle 1 will send a right turn signal S1 (i.e., a vehicle signal) by turning on the right-rear light. The vehicle sensor 141 may detect whether there is an object traveling in front of the surrounding vehicle 2. When the vehicle sensor 141 detects a truck 3 traveling in front of the surrounding vehicle 2, the vehicle sensor 141 may detect whether the truck 3 has a size larger than the surrounding vehicle 2. The size may include the height, the width, and/or depth of the object. When the vehicle sensor 141 detects that the truck 3 has a size larger than the surrounding vehicle 2, the controller 110 may determine that the truck 3 obstructs at least a portion of the LOS of the driver of the surrounding vehicle 2 and there is a high likelihood that the driver of the surrounding vehicle 2 may not perceive the right-rear light. This high likelihood indicates a high risk of a car accident between the host vehicle 1 and the surrounding vehicle 2 when the truck 3 leaves the right lane and then the host vehicle 1 turns into the right lane and thus travels in front of the surrounding vehicle 2.

Further referring to FIG. 5, the host vehicle 1 stops at the intersection when the traffic light NS2 is in the red color (i.e., a non-vehicle signal). The surrounding vehicle 2 is driving through the intersection when the traffic light NS1 is in the green color (i.e., another non-vehicle signal). When the traffic light NS2 changes from the red color to the green color and the traffic light NS1 changes from the green color to the red color, the vehicle sensor 141 may detect whether there is an object traveling in front of the surrounding vehicle 2. When the vehicle sensor 141 detects that a truck 3 is traveling in front of the surrounding vehicle 2, the vehicle sensor 141 may detect whether the truck 3 has a size (the height, the width, and/or depth of the object) larger than the surrounding vehicle 2. When the vehicle sensor 141 detects that the truck 3 has a size larger than the surrounding vehicle 2, the controller 110 may determine that the truck 3 obstructs at least a portion of the LOS of the driver of the surrounding vehicle 2 and there is a high likelihood that the driver of the surrounding vehicle 2 may not perceive that the traffic light NS1 has been changed from the green color to the red color. This high likelihood indicates a high risk of a car accident at the intersection when the host vehicle 1 and the surrounding vehicle 2 both drive through the intersection.

Then, based on the traffic data, the signal data, and/or the vehicle data, an LOS of the surrounding vehicle 2 may be determined to reflect the extent to which a driver of the surrounding vehicle 2 may perceive a vehicle signal or a non-vehicle signal (perceivability), regardless of an attentiveness of the driver. For example, when the host vehicle 1 is turning on a right turn light S1, the surrounding vehicle 2 in FIG. 4 may have an LOS of 30% because the majority of LOS is obstructed by the truck 3. For another example, when the host vehicle 1 is turning on a right turn light S1 and the traffic light NS1 is in green color, the surrounding vehicle 2 in FIG. 5 may have an LOS of 60% to perceive the S1 and may have an LOS of 50% to perceive the NS1 because a portion of LOS is obstructed by the truck 3.

The LOS may be automatically updated when the host vehicle 1, the surrounding vehicle 2, and the truck 3 change their relative positions or when the traffic data or the signal data changes.

The LOS may be determined or updated by the controller 110 of the driving assistance device 100 of the host vehicle 1, a controller 210 of the driving assistance device 200 of the surrounding vehicle 2, or a controller 410 of the server 400.

In an embodiment, the sensor assembly 140 of the driving assistance device 100 of the host vehicle 1 is further configured to obtain driver data. To this end, the sensor assembly 140 may also comprise a driver sensor 142 configured to obtain the driver data of the surrounding vehicle 2.

The driver sensor 142 may comprise an eye/face/body sensor configured to obtain the eye/face data of the driver of the surrounding vehicle 2 within the predetermined distance from the host vehicle 1. The eye/face data may be used to determine whether the driver of the surrounding vehicle 2 has actually perceived the vehicle or non-vehicle signals.

To this end, the driver sensor 142 may detect whether the driver of the surrounding vehicle 2 is facing at the vehicle or non-vehicle signals. When the driver sensor 142 detects that the driver of the surrounding vehicle 2 faces away from the sources of the vehicle or non-vehicle signals, the controller 110 may determine that there is a high likelihood that the driver of the surrounding vehicle 2 may not perceive the corresponding signals. On the other hand, when the driver sensor 142 detects that the driver of the surrounding vehicle 2 faces toward the sources of the vehicle or non-vehicle signals, the driver sensor 142 may further detect whether the driver of the surrounding 2 is looking at an object or an person other than the sources of the vehicle or non-vehicle signals. For example, the driver sensor 142 may track the eye movements or the gaze of the driver of the surrounding vehicle 2 to determine whether the eyes focus on a near-distance object, e.g., a cell phone or a GPS device.

The driver sensor 142 (e.g., the eye/face/body sensor) is further configured to track the eye movements, the facial expressions, the head gestures, or the body gestures of the driver of the surrounding vehicle 2. For example, when the driver sensor 142 detects, based on the eye movements (e.g., gaze direction), facial expressions (e.g., mouth movements), the head gestures (e.g., head nodding), or the body gestures (e.g., hand movements), that the driver of the surrounding vehicle 2 is talking to a passenger or talking on the phone, the controller 110 may determine that there is a high likelihood that the driver of the surrounding vehicle 2 may not perceive the corresponding signals. In another embodiment, the driver sensor 142 may comprise a voice sensor to detect whether the driver of the surrounding vehicle 2 is talking to a passenger or talking on the phone.

Then, based on the driver data, an attentiveness of the driver of the surrounding vehicle 2 may be determined to reflect a level of the driver of the surrounding vehicle 2 to actually perceive a vehicle signal or a non-vehicle signal. For example, when the host vehicle 1 is turning on a right turn light S1, the surrounding vehicle 2 in FIG. 4 may have an attentiveness of 20% because the driver of the surrounding vehicle 2 is having a call on the phone.

The attentiveness may be automatically updated when the driver of the surrounding vehicle 2 changes his or her eye, face, or head movements.

The attentiveness may be determined or updated by the controller 110 of the driving assistance device 100 of the host vehicle, the controller 210 of the driving assistance device 200 of the surrounding vehicle 2, or the controller 410 of the server 400.

In an embodiment, the user interface 150 of the driving assistance device 100 of the host vehicle 1 is configured to receive operation commands input by a driver of the host vehicle 1 and display data described in the present disclosure. For example, the user interface 150 may display the calculated confidence levels for the driver of the host vehicle 1. In another embodiment, the user interface 150 may be a touch screen comprising at least one touch area configured to allow the driver to input the operation commands. For example, the user interface 150 may allow the driver of the host vehicle 1 to select one of the generated routes to travel.

Server 400

Figure 6:
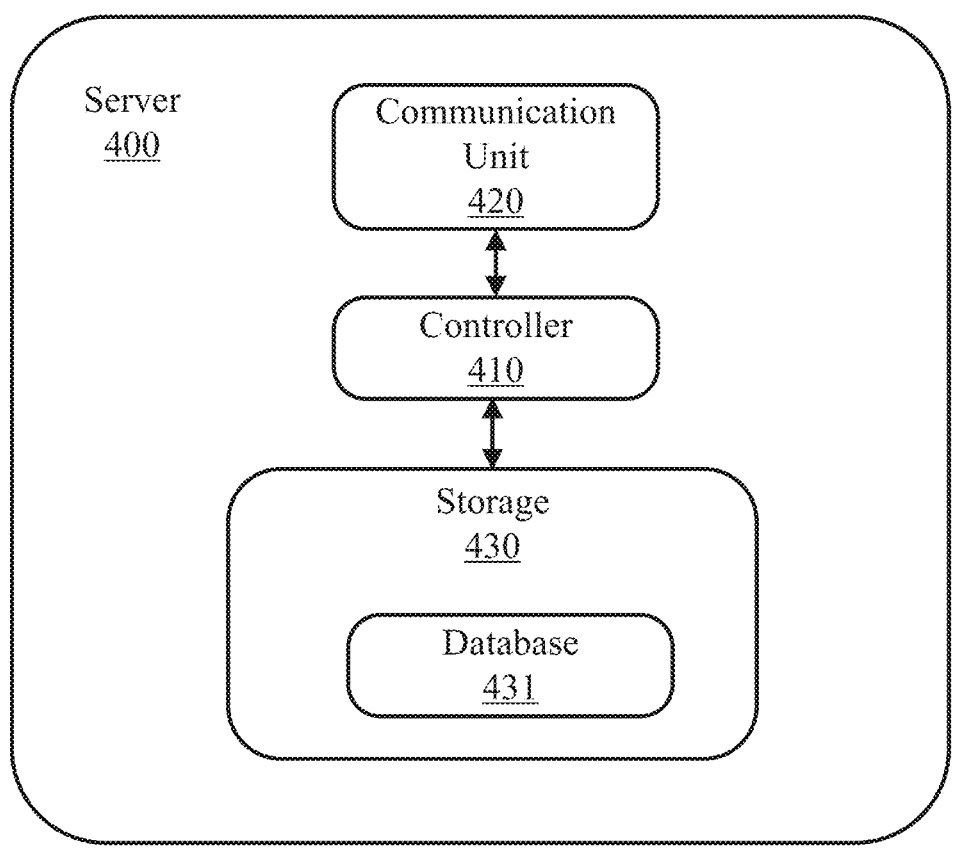
FIG. 6 is a block diagram illustrating the server according to the first embodiment of the present disclosure.
Figure 7:
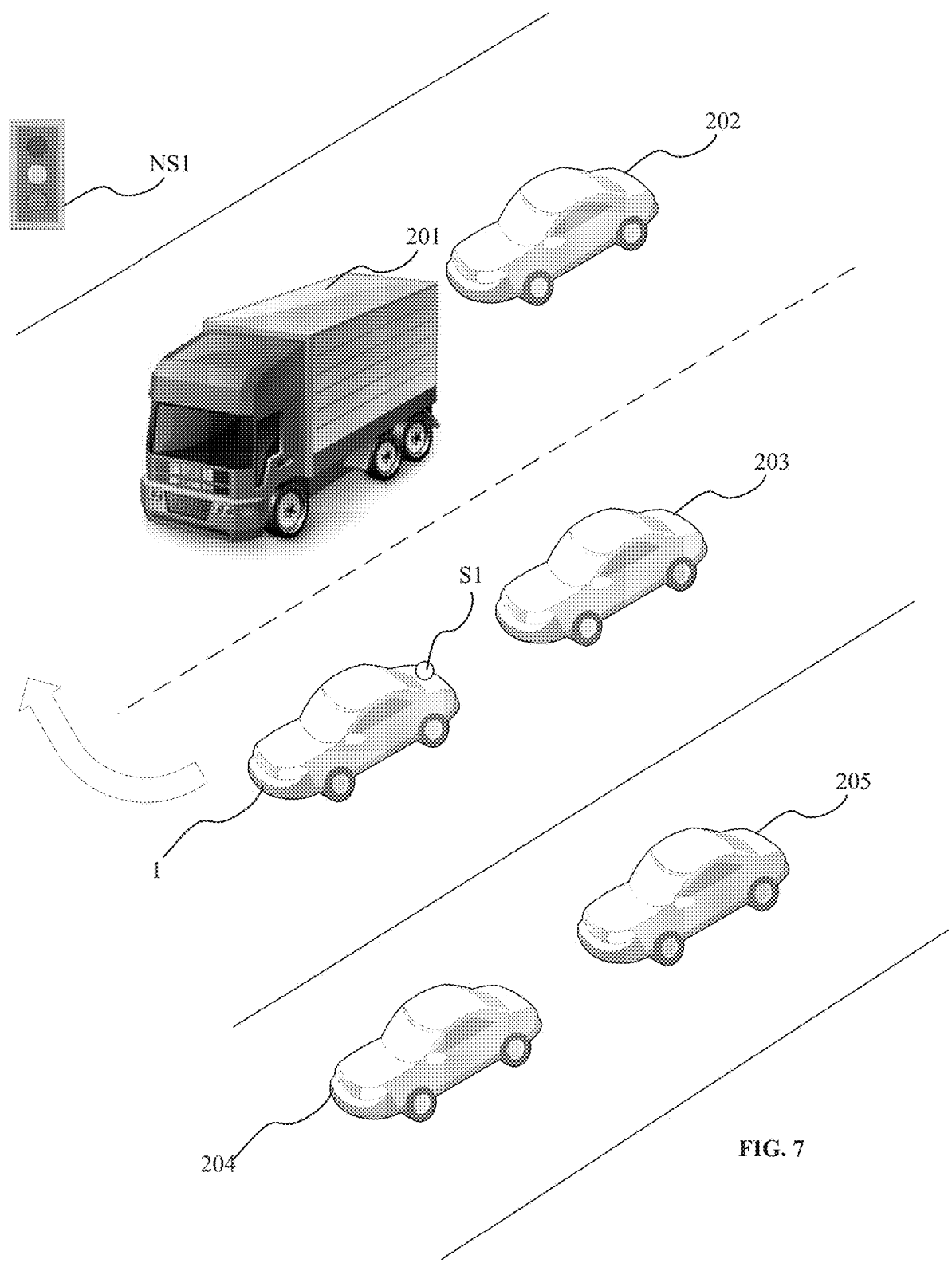
FIG. 7 is a diagram illustrating a host vehicle and five surrounding vehicles according to the first embodiment of the present disclosure.

FIG. 6 is a block diagram illustrating the server 400 according to the first embodiment of the present disclosure. FIG. 7 is a diagram illustrating a host vehicle 1 and five surrounding vehicles 201, 202, 203, 204, and 205 according to the first embodiment of the present disclosure.

As illustrated in FIG. 6, in an embodiment, the server 400 comprises a controller 410, a communication unit 420 communicably connected to the controller 410, and a storage 430 communicably connected to the controller 410. The storage 430 comprises a database 431.

In an embodiment, the controller 410, the communication unit 420, and the storage 430 may have the same structures as the corresponding elements of the host vehicle 1.

In an embodiment, the controller 410 of the server 400 is configured to determine the surrounding vehicles for the host vehicle 1. The controller 410 may obtain the vehicle data including location data for each vehicle by receiving GPS signals in real time. When the controller 410 determines that a vehicle is located within a predetermined distance, e.g., 300 feet from the host vehicle 1, the controller 410 may determine the vehicle as a surrounding vehicle. In another embodiment, instead of the controller 410 of the server 400, the controller 110 of the driving assistance device 100 may determine the surrounding vehicles 2 for the host vehicle 1 by receiving GPS signals in real time by using the sensor assembly 140.

The controller 410 of the server 400 is further configured to determine surrounding vehicles of interest from the determined surrounding vehicles. The controller 410 may then calculate the confidence levels for the surrounding vehicles of interest. To this end, the controller 410 may determine whether a surrounding vehicle affects the driving of the host vehicle 1 based on an operation of the host vehicle 1.

As illustrated in FIG. 7, the controller 410 determines five surrounding vehicles 201, 202, 203, 204, and 205 for the host vehicle 1. The arrow indicates that the host vehicle 1 is turning into the right lane. The surrounding vehicles 201, 202, and 203 may affect the operation of the host vehicle 1 because the host vehicle 1 may have a collision with these vehicles. Accordingly, the controller 410 may determine surrounding vehicles 201, 202, and 203 as the surrounding vehicles of interest. However, because the surrounding vehicles 204 and 205 are travelling on the left lane and thus do not affect the operation of the host vehicle 1. Accordingly, the controller 410 may determine that the surrounding vehicles 204 and 205 are not the surrounding vehicles of interest and may exclude the surrounding vehicles 204 and 205 from the calculation of confidence level.

The controller 410 of the server 400 is further configured to calculate the. To this end, the confidence level is calculated according to Equation 1 as follows:

$$CL(SV) = [LOS(VS1) \times ATT(VS1) + \ldots LOS(VSn) \times ATT(VSn)] \times \text{Weight 1} + [LOS(NVS1) \times ATT(NVS1) + \ldots LOS(NVSn) \times ATT(NVSn)] \times \text{Weight 2} \quad \text{Equation 1}$$

CL(SV) refers to the confidence level for the surrounding vehicle.

LOS(VS1) refers to a line of sight for the surrounding vehicle to perceive a first vehicle signal. LOS(VSn) refers to a line of sight for the surrounding vehicle to perceive an $n^{th}$ vehicle signal. LOS(NVS1) refers to a line of sight for the surrounding vehicle to perceive a first non-vehicle signal. LOS(NVSn) refers to a line of sight for the surrounding vehicle to perceive an $n^{th}$ non-vehicle signal.

ATT(VS1) refers to an attentiveness of the driver of the surrounding vehicle for the first vehicle signal. ATT(VSn) refers to an attentiveness of the driver of the surrounding vehicle for the $n^{th}$ vehicle signal. ATT(NVS1) refers to an attentiveness of the driver of the surrounding vehicle for the first non-vehicle signal. ATT(NVSn) refers to an attentiveness of the driver of the surrounding vehicle for the $n^{th}$ non-vehicle signal.

Weight 1 is applied to all vehicle signals and Weight 2 is applied to all non-vehicle signals. In another embodiment, different weights may be applied to different vehicle signals. In another embodiment, different weights may be applied to different non-vehicle signals. In another embodiment, the vehicle or non-vehicle signals may be prioritized based on the lanes and thus different vehicle or non-vehicle signals may be given based on the priorities of the vehicle or non-vehicle signals.

The controller 410 of the server 400 is further configured to generate at least one route for the host vehicle 1 based on the calculated confidence levels for the surrounding vehicles of interest. To this end, the controller 410 may generate a route to avoid a collision with a surrounding vehicle of interest having the lowest confidence level. For example, when the surrounding vehicle 202 has the lowest confidence among the surrounding vehicles of interest, the controller 410 may generate a route for the host vehicle 1 to turn into the right lane in front of the surrounding vehicle 201. Even when the surrounding vehicle 201 leaves the right lane, the controller 410 may instruct that the host vehicle 1 does not turn into the right lane in front of the surrounding vehicle 202 but behind the surrounding vehicle 202.

In another embodiment, the controller 410 may generate a route to avoid a collision with a surrounding vehicle of interest having a confidence level lower than a predetermined confidence level.

In another embodiment, instead of the controller 410 of the server 400, the controller 110 of the driving assistance device 100 may generate the route for the host vehicle 1 to turn into the right lane as discussed above.

In an embodiment, the communication unit 420 of the server 400 is configured to communicate, via the network 300, with the host vehicle 1 and/or the surrounding vehicle 2. Thus, the communicate unit 420 may obtain data from and transmit data to the host vehicle 1 and/or the surrounding vehicle 2. For example, the communicate unit 420 may deliver the calculated confidence levels from the controller 410 to the host vehicle 1.

In an embodiment, the storage 430 of the server 400 is configured to store data received from the host vehicle 1 and/or the surrounding vehicle 2. The storage 430 may comprise the database 431 configured to store the LOS for each signal determined from the vehicle data as discussed above, the attentiveness determined from the driver data as discussed above, and the confidence level calculated according to Equation 1.

For example, Table 1 below illustrates that the database 431 stores the LOS for each of the signals, the attentiveness for each of the signals, and the confidence level calculated according to Equation 2. Equation 2 is obtained from Equation 1 by applying two weights respectively to the vehicle signal and the non-vehicle signal. In this embodiment, a host vehicle 1 is turning into a right lane and turning on a right turn light S1. There are four surrounding vehicles of interest 201, 202, and 203 while the surrounding vehicles 204 and 205 are excluded from the calculation because they are traveling on the left lane to the host vehicle 1. Here, S1 refers to a right turn light, which is a vehicle signal, and NS1 refers to a traffic light, which is a non-vehicle signal. Here, the vehicle signal is given a weight of 60% and the non-vehicle signal is given a weight of 40%. Thus, the confidence level below is calculated as Equation 2 as follows:

CL(SV)=LOS(S1)×ATT(S1)×60%+LOS(NS1)×ATT(NS1)×40%  Equation 2

TABLE 1

| | ID. of Host Vehicle: 1 | | | | |
|---|---|---|---|---|---|
| ID. of Surrounding Vehicle | LOS for Vehicle Signal (S1) | Attentiveness for Vehicle Signal (S1) | LOS for Non-Vehicle Signal (NS1) | Attentiveness for Vehicle Signal (NS1) | Confidence Level |
| 201 | 100% | 70% | 100% | 100% | 0.82 |
| 202 | 40% | 50% | 80% | 80% | 0.376 |
| 203 | 100% | 80% | 90% | 60% | 0.696 |
| 204 | — | — | — | — | — |
| 205 | — | — | — | — | — |

As illustrated in Table 1 above, the surrounding vehicle 201 has a highest confidence level, the surrounding vehicle 202 has a lowest confidence level, and the surrounding vehicle 203 has a confidence level lower than the surrounding vehicle 201 and higher than the surrounding vehicle 202. This indicates that the host vehicle 1 should avoid the surrounding vehicle 202 or should be routed to pay more attention to the surrounding vehicle 202 when turning into the right lane.

Driving Assistance Device 200 of Surrounding Vehicle 2

Further referring to FIGS. 2, 3, and 4, in an embodiment, the driving assistance device 200 of the surrounding vehicle 2 comprises a controller 210, a communication unit 220 communicably connected to the controller 210, a storage 230 communicably connected to the controller 210, a sensor assembly 240 communicably connected to the controller 210, and a user interface 250 communicably connected to the controller 210.

In an embodiment, the controller 210, the communication unit 220, the storage 230, the sensor assembly 240, and the user interface 250 of the surrounding vehicle 2 may have the similar or same structures to perform the similar or functions as the corresponding elements of the host vehicle 1. Thus, the detailed descriptions of the similar or same structures and functions have been omitted herein.

As discussed above, when a vehicle functions as a surrounding vehicle 2, the vehicle is configured to perceive a vehicle signal generated or transmitted by the host vehicle 1 or a non-vehicle signal and the LOS and the attentiveness of the surrounding vehicle 2 may be determined. Thus, in another embodiment, the user interface 250 may be omitted in the surrounding vehicle 2.

Second Embodiment of Driving Assistance System

The driving assistance system according to a second embodiment of the present disclosure may have the similar or same structures to perform the similar or same functions as the system described in the first embodiment. Thus, the detailed descriptions of the similar or same structures and functions have been omitted herein.

Figure 8:
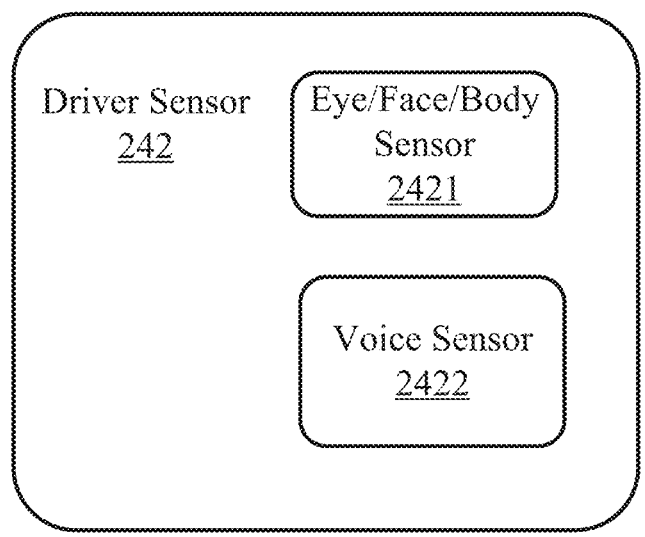
FIG. 8 is a block diagram illustrating a driver sensor of the surrounding vehicle according to a second embodiment of the present disclosure.
Figure 9:
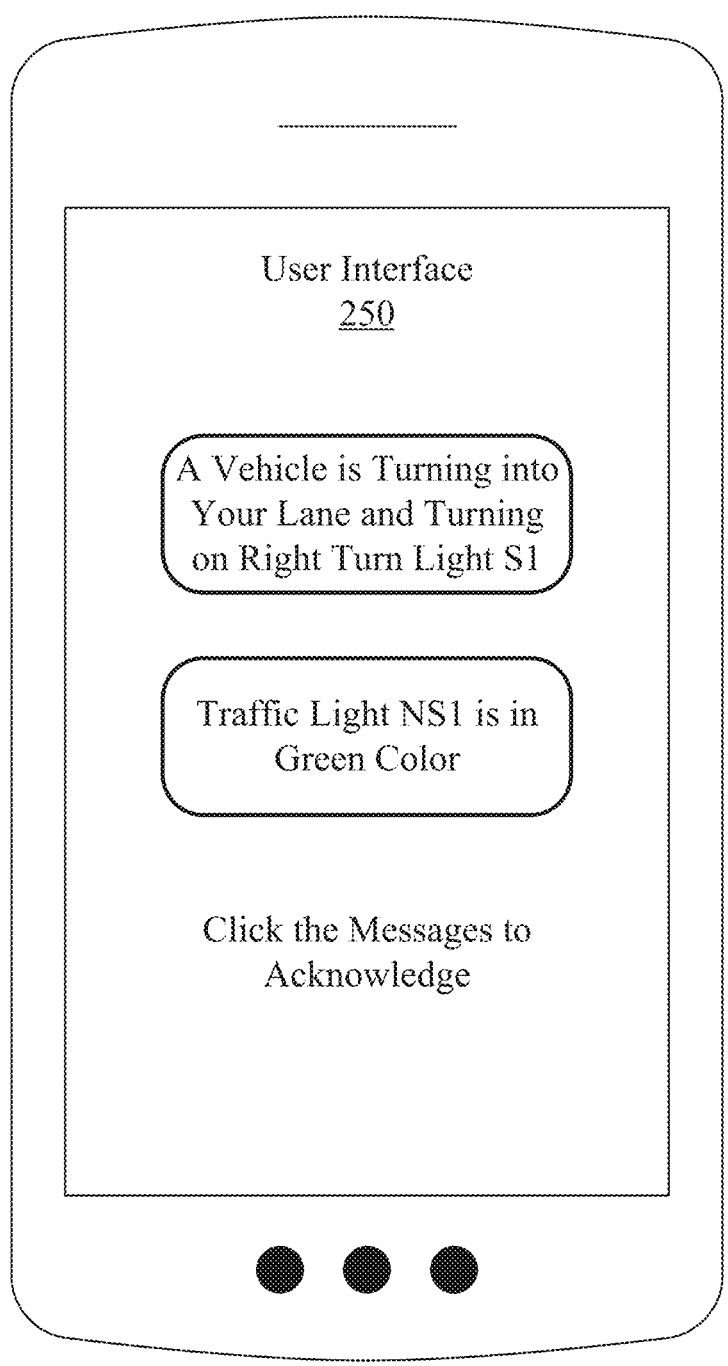
FIG. 9 is a block diagram illustrating a user interface of the driving assistance device of the surrounding vehicle according to the second embodiment of the present disclosure.
Figure 10:
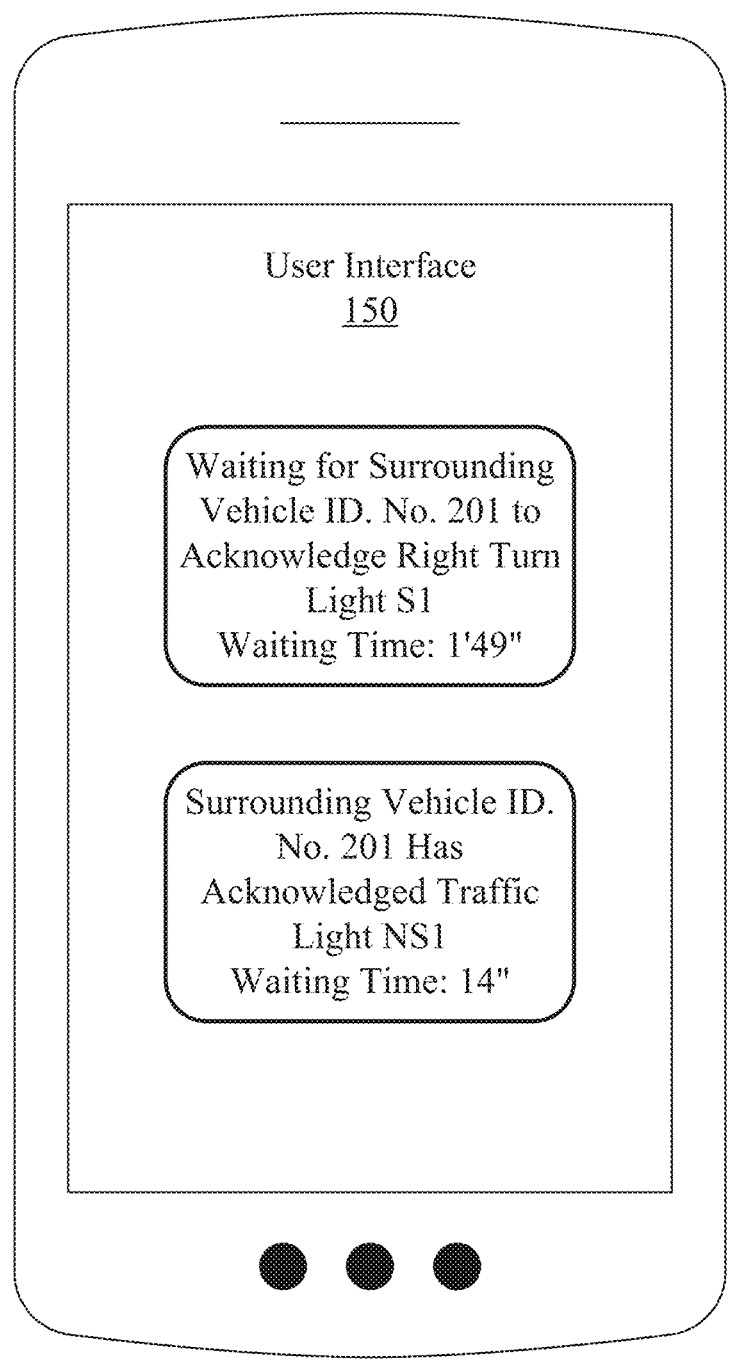
FIG. 10 is a block diagram illustrating a user interface of the driving assistance device of the host vehicle according to the second embodiment of the present disclosure.

FIG. 8 is a block diagram illustrating a driver sensor 242 of the surrounding vehicle 2 according to the second embodiment of the present disclosure. FIG. 9 is a block diagram illustrating a user interface 250 of the driving assistance device 200 of the surrounding vehicle 2 according to the second embodiment of the present disclosure. FIG. 10 is a block diagram illustrating a user interface 150 of the driving assistance device 100 of the host vehicle 1 according to the second embodiment of the present disclosure.

In an embodiment, in addition to the functions as discussed in the first embodiment, the driver sensor 242 of the surrounding vehicle 2 is further configured to obtain the response data.

Further referring to FIG. 8, in an embodiment, the driver sensor 242 comprises an eye/face/body sensor 2421 and a voice sensor 2422. As discussed in the first embodiment, the driver sensor 242 may comprise an eye/face/body sensor 2421 configured to track the eye movements, the facial expressions, the head gestures, or the body gestures of the driver of the surrounding vehicle 2. The driver of the surrounding vehicle 2 may acknowledge the perception of the vehicle or non-vehicle signals by using his or her eye movements (e.g., gaze direction), facial expressions (e.g., mouth movements), the head gestures (e.g., head nodding), or body gestures (e.g., hand movements). Thus, when the eye/face/body 2421 detects the eye movements, the facial expressions, the head gestures, or the body gestures of the driver of the surrounding vehicle 2, the controller 210 may determine whether the driver of the surrounding vehicle 2 has acknowledged the perception of the vehicle or non-vehicle signals based on the eye/face data.

The voice sensor 2422 is configured to obtain the voice data of the driver of the surrounding vehicle 2. The driver of the surrounding vehicle 2 may orally acknowledge the perception of the vehicle or non-vehicle signals. Thus, when the voice sensor 2422 detects the voice data, the controller 210 may determine whether the driver of the surrounding vehicle 2 has acknowledged the perception of the vehicle or non-vehicle signals based on the oral words contained in the voice data.

Further referring to FIG. 9, in an embodiment, the user interface 250 of the driving assistance device 200 of the surrounding vehicle 2 is configured to display notifications for the driver of the surrounding vehicle 2 to acknowledge the perception of the vehicle or non-vehicle signals. A new notification may be stacked on an older notification. As illustrated in FIG. 9, the user interface 250 displays, to the driver of the surrounding vehicle 2, two notifications "A Vehicle is Turning into Your Lane and Turning on Right Turn Light S1" and "Traffic Light NS1 is in Green Color." Thus, the driver of the surrounding vehicle 2 may click the icons to acknowledge the perception of the corresponding signals.

Further referring to FIG. 10, in an embodiment, the user interface 150 of the driving assistance device 100 of the host vehicle 1 is configured to display the status of each of the vehicle or non-vehicle signals. The status includes the information whether a signal has been acknowledged by a surrounding vehicle, the responding time, and the elapsed time. As illustrated in FIG. 10, the user interface 150 displays that the surrounding vehicle 201 has acknowledged the traffic light NS1 within 14 seconds. The user interface 150 also displays that the host vehicle 1 is still waiting for the surrounding vehicle 201 to acknowledge the traffic light NS1 and 1 minute and 49 seconds has elapsed.

By further taking the responding time and the elapsed time into consideration, the controller 410 of the server 400, the controller 110 of the driving assistance device 100, or the controller 210 of the driving assistance device 200 of the host vehicle 2 may determine or update the attentiveness of the driver of the surrounding vehicle 2.

The attentiveness may be automatically updated when the driver of the surrounding vehicle 2 acknowledges the perception of the vehicle or non-vehicle signals by using his or her eye movements, facial expressions, head gestures, body gestures, or operations on the user interface 250.

In another embodiment, the user interfaces 150 and 250 may be smart HUD displays in the host and surrounding vehicles.

Third Embodiment of Driving Assistance System

The driving assistance system according to the second embodiment of the present disclosure may have the similar or same structures to perform the similar or same functions as the system described in the first embodiment. Thus, the detailed descriptions of the similar or same structures and functions have been omitted herein.

In an embodiment, the controller 110 of the driving assistance device 200, the controller 210 of the driving assistance device 200 of the host vehicle 2, and/or the controller 410 of the server 400 are configured to apply a machine-learning model or using an artificial intelligence when determining the confidence level for each vehicle on each lane. The machine-learning model is trained by using supervised learning. To this end, labelled training datasets are created for various drivers for various driving under various distraction scenarios, e.g., listening to music, using mobile, talking with passengers, talking on phone, watching videos/social media etc. Such machine learning datasets can be created using car driving simulators using images, videos, and sound-based signals generated by multiple drivers while they perform different distraction tasks/activities during the driving. The car driving simulators are configured to emulate different signals (e.g., turn signals, traffic lights etc.). Based on the signals properly perceived or improperly perceived by each driver in the different scenarios listed above, the datasets are used to statistically compute the confidence levels for each vehicle on each lane.

The datasets may be stored in the driving assistance system as discussed above, e.g., in the driving assistance device 100 of the host vehicle 1, the driving assistance device 200 of the host vehicle 2, and/or the server 400. The driving assistance system may identify the tasks/actions performed by the driver of the host vehicle 1 and then compute the corresponding confidence level based on the stored datasets for the corresponding scenarios. The datasets can be further enhanced to provide higher confidence levels based on additional information, such as driver profiles (e.g., age of the driver, gender of the driver, distraction activity/task) and passenger profiles (e.g., the number passengers, the number of children present in the vehicle etc.).

Driving Assistance Method

Figure 11:
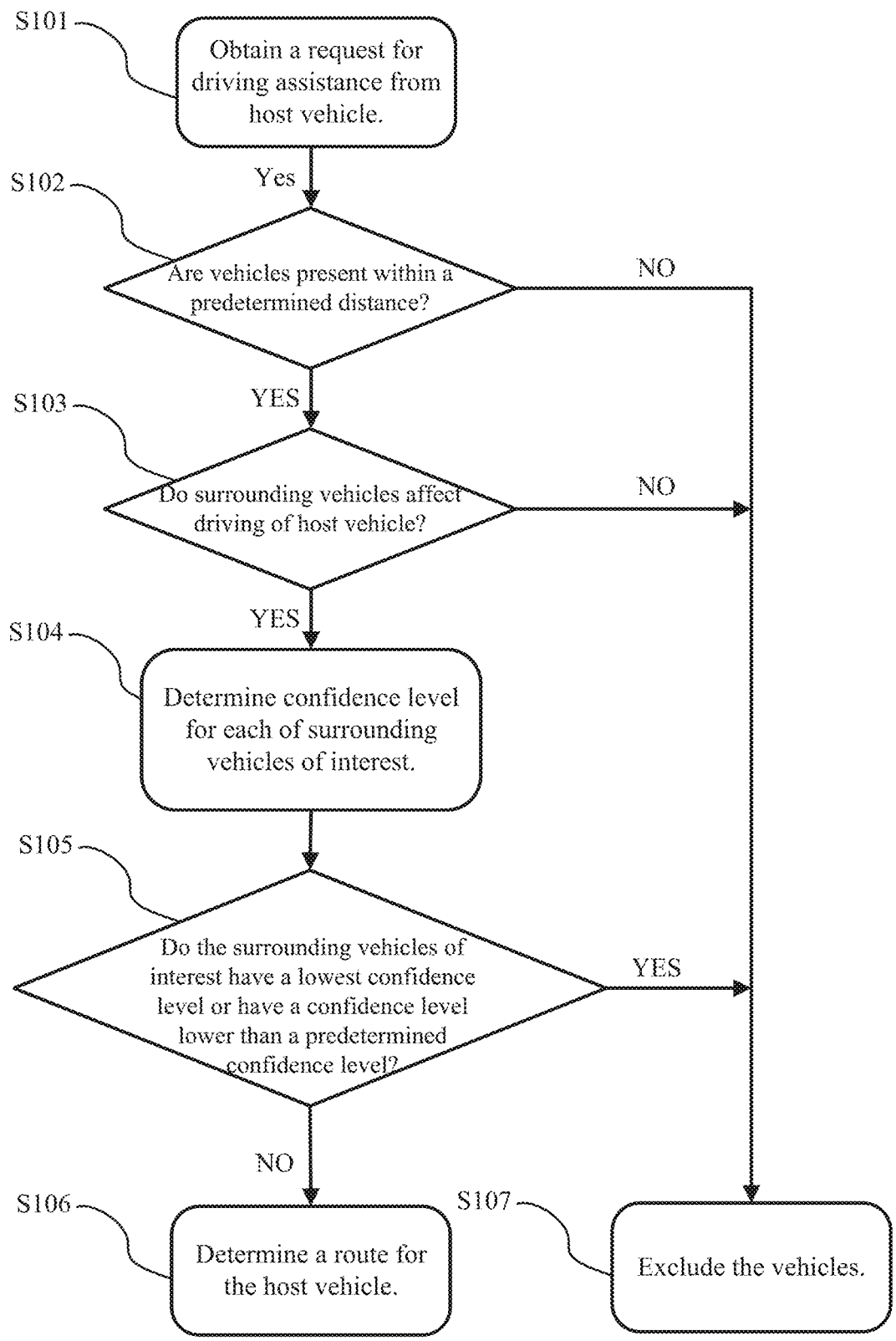
FIG. 11 is a block diagram illustrating a driving assistance method according to the present disclosure.

FIG. 11 is a block diagram illustrating a driving assistance method according to the present disclosure.

In an embodiment, the driving assistance method is performed by the server 400 as discussed above. However, in another embodiment, the driving assistance method may also be performed by the driving assistance device 100 of the host vehicle 1 and/or the driving assistance device 200 of the host vehicle 2.

In an embodiment, at act S101, the controller 410 may obtain a request for driving assistance from the host vehicle 1. To this end, the driver of the host vehicle 1 may input a command into the user interface 150 to generate the request for driving assistance. Then, the controller 410 may receive the request via the communication units 120 and 420.

At act S102, in response to the received request, the controller 410 may determine whether vehicles are present within a predetermined distance from the host vehicle 1. For example, the predetermined distance may be 300 feet. To this end, the controller 410 may determine each of the vehicles by receiving GPS signals in real time or at a predetermined time interval.

When the controller 410 determines that the vehicles are located within a predetermined distance from the host vehicle 1 (YES in act S102), the controller 410 may determine the vehicles as surrounding vehicles and the method proceeds to act S103.

At act S103, the controller 410 may determine whether the surrounding vehicles affect the driving of the host vehicle 1. To this end, the controller 410 may retrieve, from the request, an operation to be performed or being performed by the host vehicle. The controller 410 may also track the routes of the surrounding vehicles and compare the routes of the surrounding vehicles and the operation to be performed or being performed by the host vehicle 1.

When the controller 410 determines that the surrounding vehicles affect the driving of the host vehicle 1 (YES in act S103), the controller 410 may determine the vehicle as surrounding vehicles of interest 2 and the method proceeds to act S104.

At act S104, the controller 410 may determine a confidence level for each of surrounding vehicles of interest 2. To this end, the controller 410 may obtain the traffic data, the signal data, the vehicle data of the surrounding vehicles of interest 2, and/or the driver data of the surrounding vehicles of interest 2. The controller 410 may further determine the LOS of each of the surrounding vehicles of interest 2 based on the traffic data, the signal data, and/or the vehicle data to reflect the extent to which each of the drivers of the surrounding vehicles of interest 2 may perceive the vehicle signals or the non-vehicle signals (perceivability). The controller 410 may further determine an attentiveness of each of the drivers of the surrounding vehicles of interest 2 to reflect a level of each driver to actually perceive a vehicle signal or a non-vehicle signal based on the driver data. Then, the controller 410 may further determine the confidence level for each of surrounding vehicles of interest 2 based on the LOS and the attentiveness of each of the surrounding vehicles of interest 2.

At act S105, the controller 410 may determine whether each of the surrounding vehicles of the interest 2 has a lowest confidence level or has a confidence level lower than a predetermined confidence level.

When the controller 410 determines the surrounding vehicles of the interest 2 have confidence levels higher than the lowest confidence level and higher than or equal to the predetermined confidence level (NO in act S105), the method proceeds to act S106.

At act S106, the controller 410 may generate at least one route for the host vehicle 1 based on the determination at act S105 so that the host vehicle 1 may avoid potential accidents. To this end, the controller 410 may generate a route to avoid a collision with the surrounding vehicle of interest having the lowest confidence level and the surrounding vehicle of interest having the confidence level lower than the predetermined confidence level.

When the controller 410 determines that the vehicles are located beyond a predetermined distance from the host vehicle 1 (NO in act S102), the method proceeds to act S107 so that the controller 410 may exclude the vehicles for further consideration.

When the controller 410 determines that the surrounding vehicles do not affect the driving of the host vehicle 1 (NO in act S103), the method proceeds to act S107 so that the controller 410 may exclude the vehicles for further consideration.

When the controller 410 determines the surrounding vehicles have the lowest confidence level or have the confidence level lower than the predetermined confidence level (YES in act S105), the method proceeds to act S107 so that the controller 410 may exclude the vehicles for further consideration.

The driving assistance system, device, and method according to the present disclosure may determine how well the vehicle signals and the non-vehicle signals have been observed by the drivers of the surrounding vehicles. The driving assistance system, device, and method according to the present disclosure may facilitate the communications between the host vehicle and the surrounding vehicle regarding the line of sight and the attentiveness of the driver of the surrounding vehicle. Thus, the driving assistance system, device, and method according to the present disclosure may avoid or reduce potential car accidents when the surrounding vehicle fails to properly perceive the vehicle signals or the non-vehicle signals.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, should be apparent to those of skill in the art upon reviewing the description.

It is intended that the foregoing detailed description be regarded as illustrative rather than limiting and that it is understood that the following claims including all equivalents are intended to define the scope of the invention. The claims should not be read as limited to the described order or elements unless stated to that effect. Therefore, all embodiments that come within the scope and spirit of the following claims and equivalents thereto are claimed as the invention.

What is claimed is:

1. A driving assistance apparatus, comprising:
   a memory;
   a sensor assembly configured to detect an object and determine a size of the object and a size of at least one surrounding vehicle; and
   a processor in communication with the memory and configured to execute instructions stored in the memory operable to:
   determine the at least one surrounding vehicle based on location information of the at least one surrounding vehicle, wherein the at least one surrounding vehicle is configured to receive at least one vehicle signal from a host vehicle;
   determine a line of sight (LOS) of the at least one surrounding vehicle based on the at least one vehicle signal, wherein the line of sight is defined by a perceivability of a driver of the at least one surrounding vehicle to view the at least one vehicle signal;

determine, by comparing the size of the object and the size of the at least one surrounding vehicle, whether at least a portion of the LOS of the driver of the at least one surrounding vehicle to perceive the at least one vehicle signal is obstructed by the object, wherein the perceivability of the driver of the at least one surrounding vehicle to view the at least one vehicle signal is determined based on an extent to which the object obstructs the at least one surrounding vehicle to view the at least one vehicle signal; and determine a confidence level of the at least one surrounding vehicle based on the determined LOS.

2. The driving assistance apparatus according to claim 1, wherein the LOS of the at least one surrounding vehicle is further determined based on at least one non-vehicle signal, wherein the processor is further configured to determine, by comparing the size of the object and the size of the at least one surrounding vehicle, whether at least a portion of the LOS of the driver of the at least one surrounding vehicle to perceive the at least one non-vehicle signal is obstructed by the object, and wherein the perceivability of the driver of the at least one surrounding vehicle to view the at least one vehicle signal is determined based on an extent to which the object obstructs the at least one surrounding vehicle to perceive the at least one non-vehicle signal.

3. A driving assistance apparatus, comprising:

a memory; and a processor in communication with the memory and configured to execute instructions stored in the memory operable to:

determine at least one surrounding vehicle based on location information of the at least one surrounding vehicle, wherein the at least one surrounding vehicle is configured to receive at least one vehicle signal from a host vehicle;

determine a line of sight (LOS) of the at least one surrounding vehicle based on the at least one vehicle signal, wherein the line of sight is defined by a perceivability of a driver of the at least one surrounding vehicle to view the at least one vehicle signal;

determine an attentiveness of the driver of the at least one surrounding vehicle based on driver data of the driver of the at least one surrounding vehicle, wherein the attentiveness is defined by a level of the driver of the at least one surrounding vehicle to perceive the at least one vehicle signal; and determine a confidence level of the at least one surrounding vehicle based on the determined attentiveness and the determined LOS.

4. The driving assistance apparatus according to claim 3, further comprising a sensor assembly configured to obtain the driver data of the driver of the at least one surrounding vehicle, wherein the processor is further configured to determine, based on the driver data, whether the driver of the at least one surrounding vehicle is performing at least one distraction activity.

5. The driving assistance apparatus according to claim 4, wherein the attentiveness of the driver of the at least one surrounding vehicle is further determined based on at least one non-vehicle signal, wherein the driver data comprises at least one of an eye movement, a facial expression, a head gesture, a body gesture, or oral words of the driver of the at least one surrounding vehicle, and wherein the processor determines that the driver of the at least one surrounding vehicle is performing the at least one distraction activity when the sensor assembly detects that the driver of the at least one surrounding vehicle is facing away from a source of the at least one vehicle signal or a source of the at least one non-vehicle signal.

6. The driving assistance apparatus according to claim 5, wherein the driver data further comprises response data of the driver of the at least one surrounding vehicle, wherein the response data comprises responding time when the driver of the at least one surrounding vehicle acknowledges a perception of the at least one vehicle signal or the at least one non-vehicle signal, and wherein the response data further comprises elapsed time when the driver of the at least one surrounding vehicle fails to acknowledge the perception of the at least one vehicle signal or the at least one non-vehicle signal.

7. The driving assistance apparatus according to claim 6, wherein the processor is further configured to apply a machine-learning model trained by creating at least one training dataset, wherein the at least one training dataset is created by using at least one vehicle driving simulator configured to use images, videos, or audios generated by multiple drivers while the multiple drivers perform a plurality of distraction tasks, and wherein the processor is further configured to use the at least one training dataset to determine the confidence level of the at least one surrounding vehicle.

8. The driving assistance apparatus according to claim 7, wherein the at least one training dataset is enhanced by driver profiles of the multiple drivers or passenger profiles.

9. The driving assistance apparatus according to claim 8, wherein the driving assistance apparatus is installed in the host vehicle, the at least one surrounding vehicle, or a driving assistance server.

10. A driving assistance method, comprising:

obtaining a request for driving assistance from a host vehicle configured to transmit at least one vehicle signal;

determining at least one surrounding vehicle based on location information of the at least one surrounding vehicle, wherein the at least one surrounding vehicle is configured to receive the at least one vehicle signal from the host vehicle;

detecting, by a sensor assembly, an object;

determining a size of the object and a size of the at least one surrounding vehicle;

determining a line of sight (LOS) of the at least one surrounding vehicle based on the at least one vehicle signal, wherein the line of sight is defined by a perceivability of a driver of the at least one surrounding vehicle to view the at least one vehicle signal;

determining, by comparing the size of the object and the size of the at least one surrounding vehicle, whether at least a portion of the LOS of the driver of the at least one surrounding vehicle to perceive the at least one vehicle signal is obstructed by the object, wherein the perceivability of the driver of the at least one surrounding vehicle to view the at least one vehicle signal is determined based on an extent to which the object obstructs the at least one surrounding vehicle to view the at least one vehicle signal determining a confidence level of the at least one surrounding vehicle based on the determined LOS; and determining at least one route for the host vehicle based on the determined confidence level of the at least one surrounding vehicle.

11. The driving assistance method according to claim 10, further comprising:

determining the LOS of the at least one surrounding vehicle based on at least one non-vehicle signal;

determining, by comparing the size of the object and the size of the at least one surrounding vehicle, whether at least a portion of the LOS of the driver of the at least one surrounding vehicle to perceive the at least one non-vehicle signal is obstructed by the object; and determining the perceivability of the driver of the at least one surrounding vehicle to view the at least one vehicle signal based on an extent to which the object obstructs the at least one surrounding vehicle to perceive the at least one non-vehicle signal.

12. The driving assistance method according to claim 10, further comprising:

determining an attentiveness of the driver of the at least one surrounding vehicle based on driver data of the driver of the at least one surrounding vehicle;

wherein the attentiveness is defined by a level of the driver of the at least one surrounding vehicle to perceive the at least one vehicle signal; and wherein the confidence level of the at least one surrounding vehicle is determined based on the determined attentiveness.

13. The driving assistance method according to claim 12, further comprising:

obtaining, by a sensor assembly, the driver data of the driver of the at least one surrounding vehicle; and determining, based on the driver data, whether the driver of the at least one surrounding vehicle is performing at least one distraction activity.

14. The driving assistance method according to claim 13, wherein the attentiveness of the driver of the at least one surrounding vehicle is further determined based on at least one non-vehicle signal, wherein the driver data comprises at least one of an eye movement, a facial expression, a head gesture, a body gesture, or oral words of the driver of the at least one surrounding vehicle, and wherein the driver of the at least one surrounding vehicle is determined to be performing the at least one distraction activity when the sensor assembly detects that the driver of the at least one surrounding vehicle is facing away from a source of the at least one vehicle signal or a source of the at least one non-vehicle signal.

15. The driving assistance method according to claim 14, wherein the driver data further comprises response data of the driver of the at least one surrounding vehicle, wherein the response data comprises responding time when the driver of the at least one surrounding vehicle acknowledges a perception of the at least one vehicle signal or the at least one non-vehicle signal, and wherein the response data further comprises elapsed time when the driver of the at least one surrounding vehicle fails to acknowledge the perception of the at least one vehicle signal or the at least one non-vehicle signal.

16. The driving assistance method according to claim 15, further comprising:

applying a machine-learning model trained by creating at least one training dataset, wherein the at least one training dataset is created by using at least one vehicle driving simulator configured to use images, videos, or audios generated by multiple drivers while the multiple drivers perform a plurality of distraction tasks, and wherein the confidence level of the at least one surrounding vehicle is determined based on the at least one training dataset.

\* \* \* \* \*